Sept. 13, 1960     J. M. MACCHIONE     2,952,072
PROCESS AND MACHINE FOR ASSEMBLING E PLATES IN A COIL
Filed March 10, 1958     6 Sheets-Sheet 1

United States Patent Office 2,952,072
Patented Sept. 13, 1960

2,952,072
PROCESS AND MACHINE FOR ASSEMBLING E PLATES IN A COIL

John M. Macchione, Park Ridge, Ill.
(R.R. 1, Box 853, Fair Oaks Road, West Chicago, Ill.)

Filed Mar. 10, 1958, Ser. No. 720,109

15 Claims. (Cl. 29—203)

The invention relates generally to a process and machine for assembling E plates in a coil but relates more particularly to a process and machine for inserting the E plates in butt-stacked relation as distinguished from the interleaving of E and I plates.

Machines have heretofore been designed for this purpose but they are open to one or more objections. In one machine commonly used a full "slug" or group of E plates is removed from a magazine containing a stack of E plates.

The ejected slug or group of E plates is then held in position while the operator manually pushes a coil into position.

In machines of this type considerable trouble is caused by jamming. The E plates, as conventionally produced, vary in thickness. While such variation may not be serious when considering a single E plate, yet when a "slug" or group of such plates sufficient for assembly in a coil is considered, the cumulative variations do become serious. It is because of this size variation that in the ejecting operation jamming occurs which results in wasted time and material.

The general object of the invention is to provide a process and machine for assembling E plates in a coil in butt-stacked relation in less time than is possible with machines heretofore devised.

A further object of the invention is to provide a process and machine for the purpose stated which shall eliminate or greatly reduce jamming of the E plates.

It is also an object of the invention to provide a machine for the purposes stated which shall be of such construction that should jamming occur the jam can be quickly and easily cleared.

Again, it is an object of the invention to provide a machine for the purpose stated which shall be of such construction that all of the main operating parts may continue in motion while a completed coil and E plate assembly is being removed and a new coil is being placed in position to receive the required number of E plates.

The manner in which the above named objects, together with others, are attained will be more readily understood by reference to the accompanying drawings which show a preferred and practical embodiment of the invention.

GENERAL DESCRIPTION OF MACHINE OPERATION

Figures 2, 3, 4, 5:
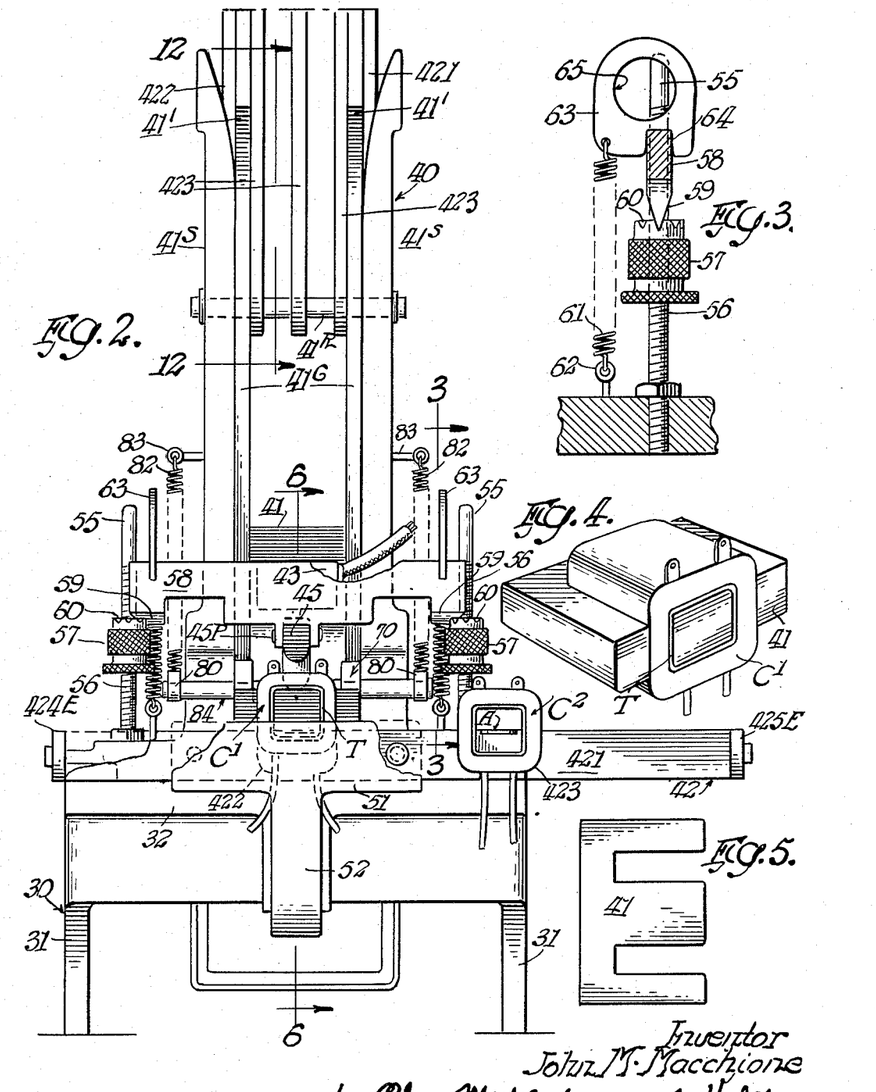
Fig. 2 is a view in front end elevation of the machine appearing in Fig. 1.
Fig. 3 is a detail vertical sectional view through a part of the machine as taken on the line 3—3 of Fig. 2 but on a larger scale.
Fig. 4 is a perspective view of a butt-stacked E plate and coil assembly produced by the machine.
Fig. 5 is a plan view of one of the E plates employed in the assembly of Fig. 5.

The machine illustrated is designed to insert the requisite number of E plates in an open ended coil to provide a coil and E plate assembly such as is shown in Fig. 4. This is known as and will be termed a butt-stacked arrangement.

Figures 9, 10:
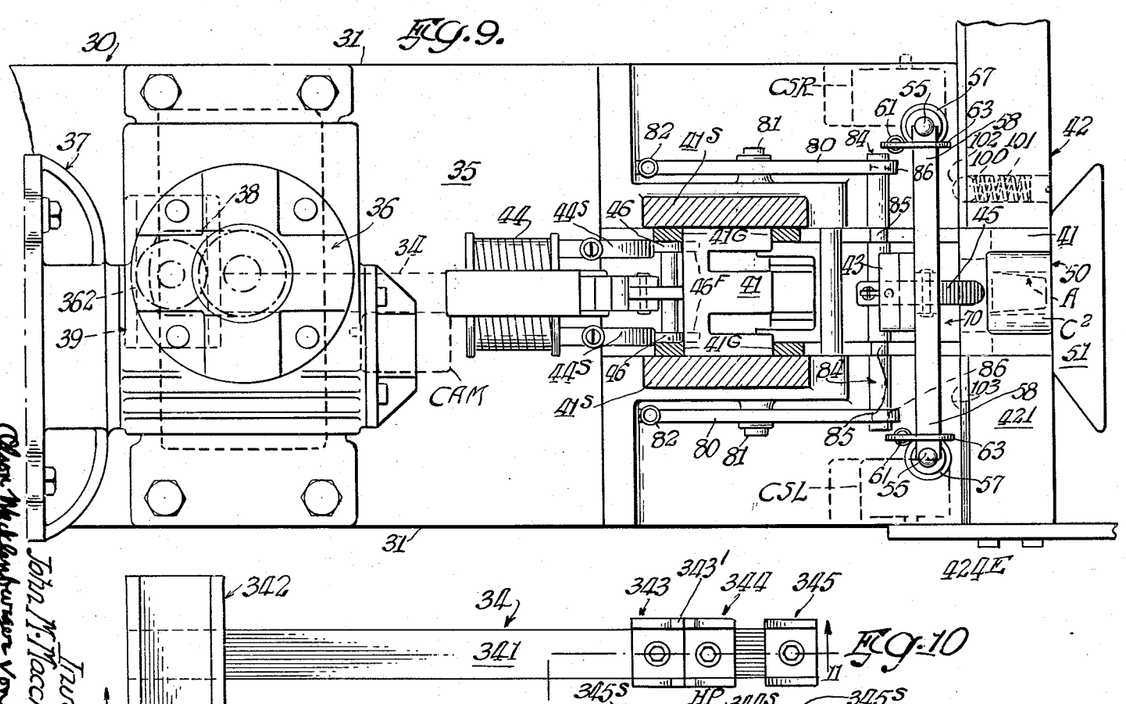
Fig. 9 is a horizontal sectional view through the machine as taken on the line 9—9 of Fig. 1.
Fig. 10 is a plan view of an ejector feed-slide which is reciprocated to remove E plates from the magazine and advance them to coil assembly position.
Figure 11:
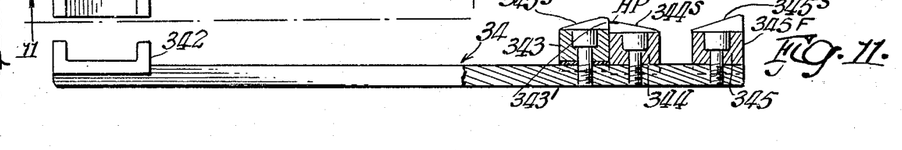
Fig. 11 is a view of the ejector feed-slide of Fig. 10, partly in side elevation and partly in longitudinal vertical section on the line 11—11 of Fig. 10.

The machine comprises a frame structure provided with a horizontally disposed way in which the ejector feed-slide of Figs. 10 and 11 is mounted for reciprocation.

Figures 16, 17, 18, 19, 20:
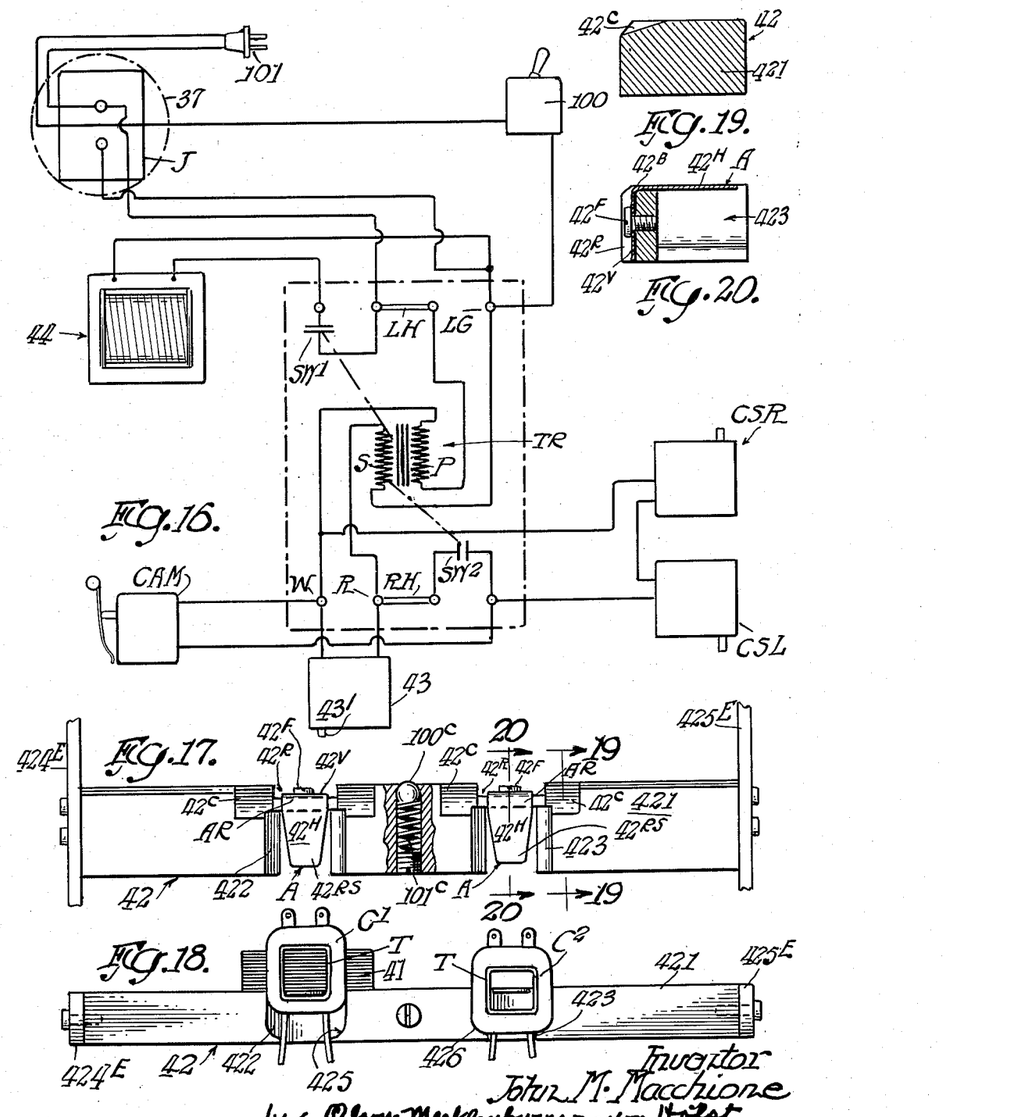
Fig. 16 is a diagrammatic view of the electrical circuit employed in the machine.
Fig. 17 is a plan view (with a portion broken away for illustrative purposes) of a cross-slide which is slidable transversely of the machine and which is designed to hold two coils.
Fig. 18 is a front elevational view of the cross-slide appearing in Fig. 17, showing one coil with which E plates have been assembled, and a second coil with which E plates are to be assembled.
Figs. 19 and 20 are respectively detail transverse sectional views through parts of the cross-slide, as taken on the lines 19—19 and 20—20 of Fig. 17 but on a larger scale.

At the front end of the machine there is provided a cross-slide shown in detail in Figs. 17 and 18 and adapted to hold two coils, one in a position to receive E plates and the other laterally offset therefrom and adapted to be moved into assembly position when the other coil has received its full quota of E plates as will be obvious by reference to Fig. 2.

The E plates are held in stack formation in a magazine rearwardly of the front end of the machine. In the forward movement of the ejector feed-slide of Figs. 10 and 11 the lowermost E plate of the stack is first moved to a position intermediate the bottom of the stack and the position of the coil at the front of the machine; on the reverse movement the ejector feed-slide moves to a position so that when it again moves forward the first mentioned E plate is moved from the intermediate position into assembly with the coil and the second E plate is moved to the intermediate position. Thus, when the machine is in operation after its initial start, an E plate is moved from the intermediate position to the coil assembly position and another from the magazine to the intermediate position with every forward stroke of the ejector feed-slide of Figs. 10 and 11, as should be obvious by reference to Fig. 6, which shows the ejector feed-slide in its rear position by means of full lines and its forward position by dotted lines.

As explained later, each time an empty coil is moved to assembly position the ejector feed-slide must make one forward stroke before there is an E plate in the intermediate position for advancement into the coil.

Means, which will be described in detail later, prevent the E plate, when in its intermediate position, from being carried rearwardly with the rearward movement of the ejector feed-slide but which permits the forward movement from the intermediate position to coil assembly position. Means are also provided so that when the required stack of E plates has been built up in that coil which is then in assembly position, relative movement is caused between the stack of E plates in the magazines and the pick-off portion of the ejector feed-slide whereby reciprocating movement of the latter continues without, however, advancing any E plates until the filled coil has been removed, an empty coil has been moved to assembly position, and the ejector feed-slide has reached a position at one end of its stroke, at which time the parts again automatically become operative to remove E plates from the bottom of the stack and advance them, as before described. In this way it becomes possible to operate at high speed since it is not necessary to stop the movement of the parts each time a coil is stacked and danger of jamming is, at the same time, avoided. The result is that the machine is capable of properly producing stacked or loaded coils at a high rate of speed.

It is believed the foregoing general description will facilitate an understanding of the specific machine which is disclosed in the instant application and which illustrates a preferred practical embodiment of the invention, wherewith the process can be practiced.

GENERAL DESCRIPTION AND LOCATION OF THE MAIN PARTS OF THE MACHINE

The machine comprises a base frame which, as a whole, bears the reference 30. It is of hollow formation having side wall portions 31, cross-connected at the top by a plate portion 32.

Centrally of the upper face of the top plate there is an elongated groove 33 in which the E plate ejector feed-slide which, as a whole, bears the reference 34, is mounted for fore and aft reciprocatory movement (see Figs. 1, 6, 10, 11 and 15).

Figure 1:
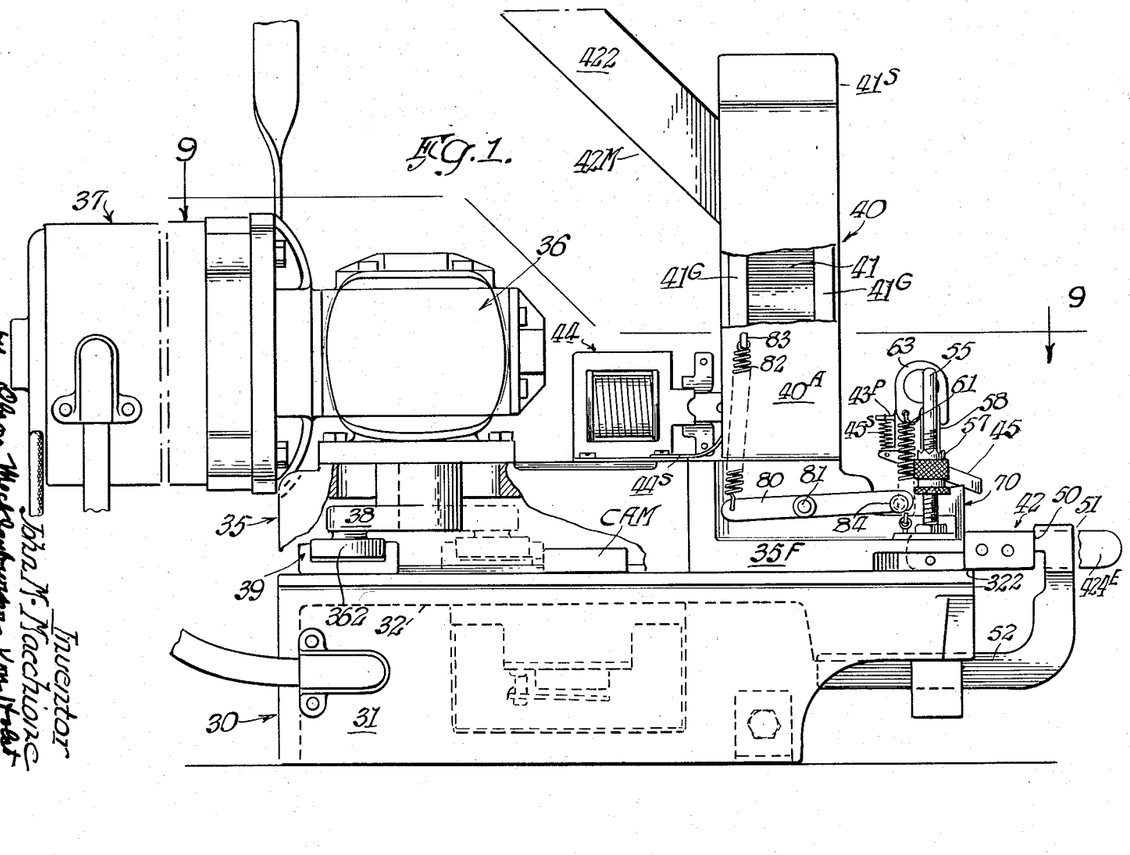
Fig. 1 is a view in side elevation of a machine embodying the preferred form of the invention, with parts broken away for illustrative purposes, and wherewith the process may be practiced.

Mounted on and upstanding from the rear end of the base 30 is a frame member 35 on which is mounted a reduction gear 36 which is driven by the electric motor 37 (see Figs. 1, 9 and 16).

By means of the crank arm 38 and Scotch yoke construction 39 (see Fig. 1) the E plate ejector feed-slide 34 is reciprocated whenever the motor is in operation, as will be explained in greater detail later.

Forward of the frame member 35 is a frame member 35F on which is mounted a magazine 40 carrying a stack of E plates 41.

At the front end of the machine is a cross-slide 42 (see Figs. 1, 2, 9, 17 and 18) in which there is provided means for holding two coils, as will be explained in detail later.

43 (Fig. 6) represents an electric switch of the closed type, normally held open, but which is permitted to close the circuit to solenoid 44 rearwardly of the E plate magazine 40 when the uppermost E plate in the coil actuates lever 45, whereupon, through lever means 46, associated with the solenoid 44, the stack of E plates is elevated sufficiently to permit continued reciprocation of the ejector feed-slide 34 without, however, removing E plates from the bottom of the stack in the magazine.

The foregoing general description of operation and location of the principal parts should facilitate understanding of the function and operation of the other parts of the machine which will now be described in detail under separate headings.

The ejector feed-slide drive

The ejector feed-slide 34 is best shown in Figs. 1, 6, 10, 11 and 15. It comprises an elongated bar portion 341 of rectangular cross section, to the rear of which there is secured a grooved member 342 whereby the ejector feed-slide can be reciprocated through the medium of the crank arm 38 and roller 362 of the reduction gear means 36 (see Fig. 1), which constitutes a Scotch yoke type mechanism.

At the forward end of the ejector feed-slide 34 (see Figs. 6, 10 and 11) there is affixed three upstanding lugs 343, 344, 345 having inclined surface portions 343S, 344S and 345S, the functions of which will later appear.

Figures 6, 7, 8:
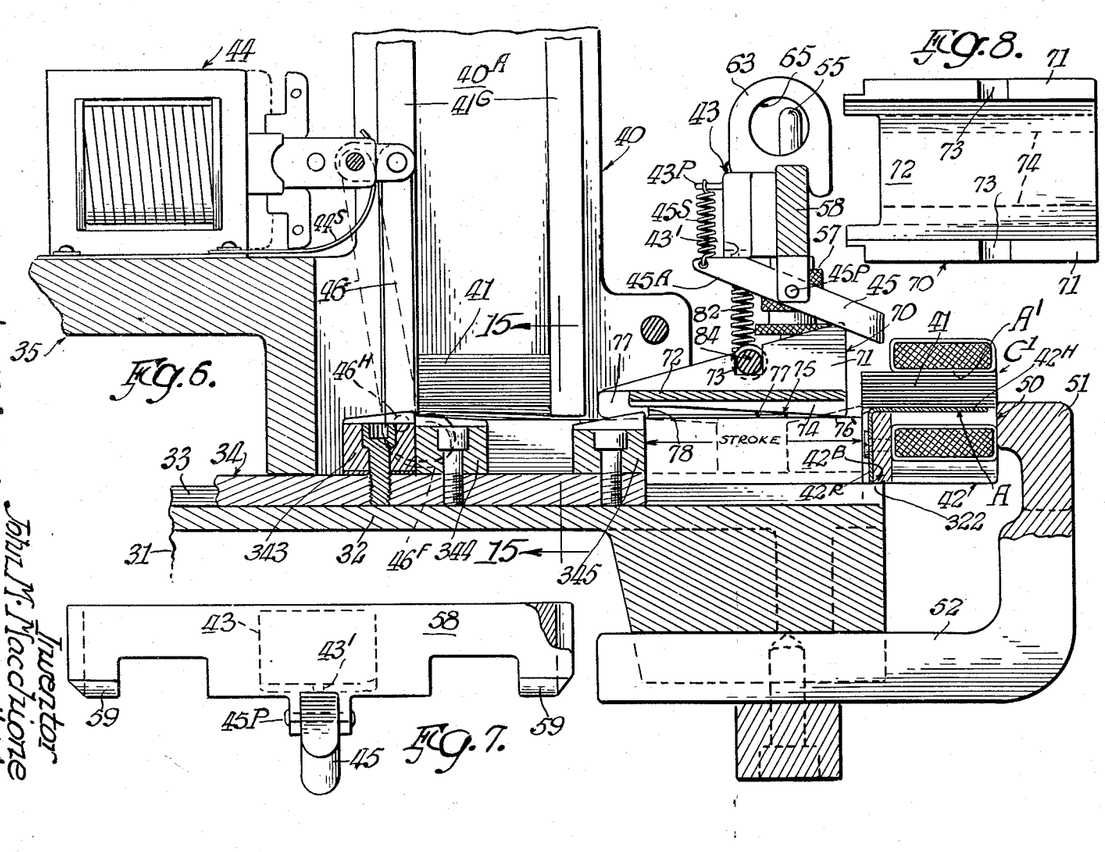
Fig. 6 is a fragmentary detail vertical sectional view as taken on the line 6—6 of Fig. 2 but on a larger scale.
Fig. 7 is a view in front elevation of the limit switch support which is located adjacent the coil and E plate assembly position.
Fig. 8 is a top plan view of a ratchet plate which is located just rearwardly of the coil assembly position and which releasably holds an E plate in the intermediate position against rearward movement but permits movement of said plate from said intermediate position forwardly to the assembled position in the coil.
Figures 12, 13, 14, 15:
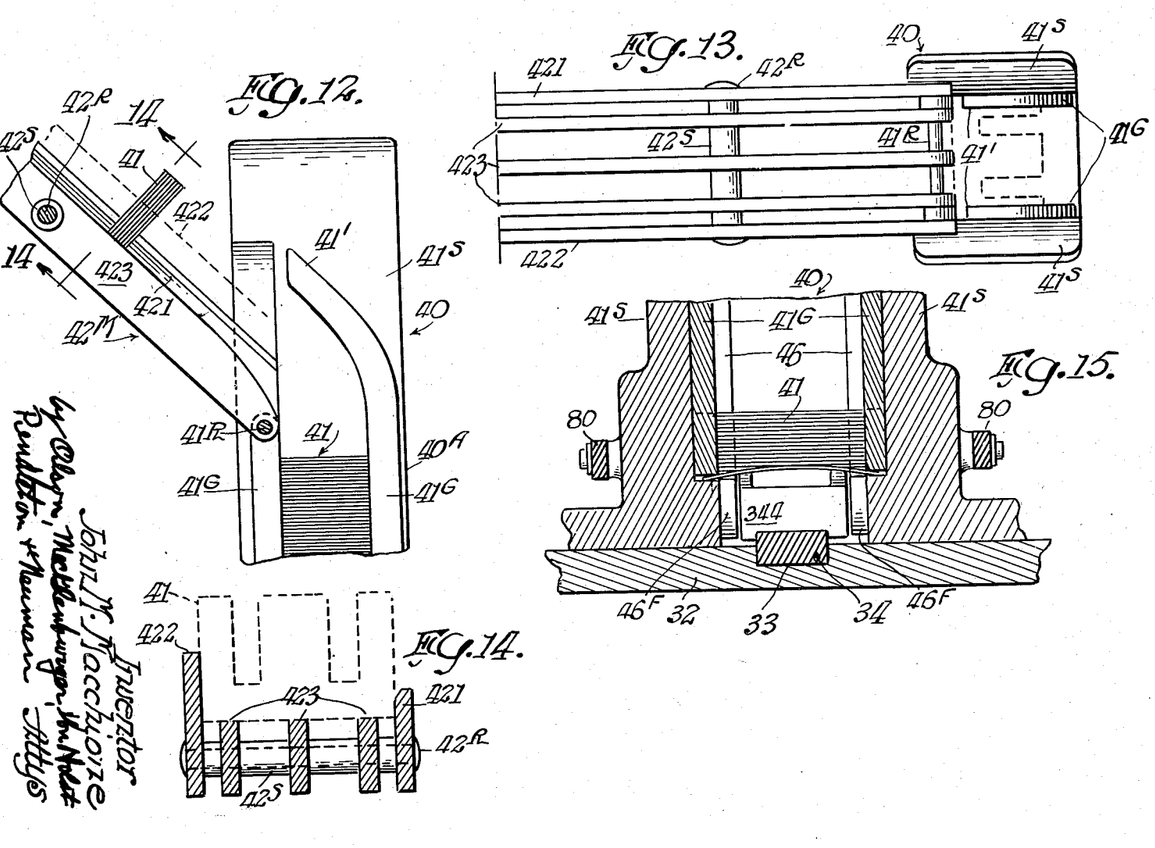
Fig. 12 is a vertical sectional view through a portion of the E plate magazine and its extension as taken on the line 12—12 of Fig. 2, some of the E plates being shown for illustrative purposes.
Fig. 13 is a plan view of the parts appearing in Fig. 12, the E plates appearing in Fig. 12 being omitted for illustrative purposes.
Fig. 14 is a transverse sectional view through the magazine extension as taken on the line 14—14 of Fig. 12 but on a scale enlarged thereover, the position of the E plates being indicated by means of dotted lines.
Fig. 15 is a fragmentary vertical sectional view as taken on the line 15—15 of Fig. 6.

As before explained, the member 34 slides back and forth in the elongated groove or way 33 formed in the top plate 32 of the base, as is best shown in Figs. 1, 6 and 15.

The cross-slide 42

The details of the cross-slide 42 are best shown in Figs. 1, 2, 6, 17 and 18. It comprises an elongated bar-like body portion 421, provided with laterally spaced recesses 422, 423, opening through the top and formed to permit the placement of coils in each thereof. In Figs. 1, 6 and 18 the coils have been numbered C1 and C2, C1 (in Fig. 6) being shown in position to receive E plates and having received a number less than the full complement.

The bottom marginal portions of the coils C1—C2 are curved, for which reason the recesses 422, 423 of the cross-slide are curved, as indicated at 425, 426. This construction permits an empty coil to be inserted into recess 422 or 423, depending upon the position of the cross-slide 42. The empty coil may be inserted from the front of member 422 by pushing it into the associated recess and the loaded coil withdrawn by simply pulling it forward toward the operator positioned in the front of the machine.

The cross-slide 42 carries at its ends members 424E and 425E designed to operate certain electric switches, later to be described.

A bottom portion 42B of the cross-slide 42 is supported and has sliding movement upon the upper front end portion 322 of the frame portion 32.

The front face portion of the cross-slide 42 also has sliding engagement with the adjacent vertical face 50 of the head portion 51 of bracket 52 which is removably secured to the frame of the machine, as best shown in Figs. 1, 2, 6 and 9.

Supporting means for solenoid actuating switch and related parts

As before explained, an electric switch 43 is provided at the front of the machine for energizing the solenoid 44 that is positioned rearwardly of the E plate magazine.

The means for supporting these parts is best shown in Figs. 1, 2, 3, 6 and 9. Secured to and upstanding from the frame of the machine adjacent to but rearwardly of the cross-slide 42 are two laterally spaced rods 55, the lower parts of which are threaded as indicated at 56 to permit the vertical adjustment of thumb actuatable nuts 57 (best shown in Fig. 3), the function of which is to support the cross-bar 58. The lower end portions of the cross-bar 58 are tapered, as indicated at 59 so that the cross-bar can rest in any of the grooves provided by the serrations 60 in the upwardly facing peripheral portions of nuts 57.

The cross-bar 58 is removably held in position by means of tension springs 61, the lower ends of which are attached to the eyes 62 secured in the frame of the machine and at the upper end to members 63—63 each having a recess 64 therein adapted to embrace the upper marginal portion of the cross-bar (see Fig. 3). In this way the cross-bar 58 is removably held in position. In order to remove the cross-bar 58 it is but necessary to elevate the member 63 which conveniently can be done by inserting the thumbs or fingers in the opening 65 provided in each of the members 63.

The lever 45 is mounted in the cross-bar 58 on a horizontal pivot 45P for swinging movement in a vertical plane, having its rear end connected to the bottom end of a tension spring 45S, the upper end of which is secured to a pin 43P attached to the housing of switch 43. In this way the rear end of the lever 45 is held resiliently in an upper position whereby the pin 43' of the switch 43 is normally held in a position to prevent energization of the solenoid 44, as will be explained in detail later. At the same time the forward end of the lever 45 is maintained in a lower position to be engaged by the uppermost E plate of the coil when one less than the full complement of E plates has been assembled in the coil, at which time the forward end is elevated, permitting the pin 43' of switch 43, which is of the normally closed type, to be projected outwardly, thereby closing the circuit and causing the solenoid to be energized, as will be explained later in detail in connection with the description of the circuit diagram, Fig. 16.

*The solenoid, E plate magazine and associated parts*

The magazine 40 comprises a lower portion 40A which is perpendicular or normal to the plane of the top of the machine and an upper portion 42M which is inclined upwardly and rearwardly, as is best shown in Figs. 1, 2, 12 and 13. The lower portion 40A comprises side plates 41S. Disposed on and secured to the inner faces of the side plates 41S are pairs of guide rails 41G spaced apart a distance sufficient to permit the E plates to be accommodated therebetween in such manner that they may slide downwardly when the stack of E plates is unsupported.

The upper portion 42M comprises side rails 421—422 and a center rail 423. The lower end of portion 42M is secured to the upright portion 41 by means of a rod 41R. (See Figs. 2 and 13.)

Spaced along the portion 42M are a plurality of transverse rods 42R which contain a plurality of sleeves 42S (see Figs. 12 and 13) which serve to hold the various rails in proper spaced relation. It will be noted that the side rails 421—422 are of greater height than the intermediate rails 423. This construction serves to confine the E plates against displacement but at the same time permits them to slide downwardly by gravity toward the upright section of the magazine. The upper portions of the members 41G are curved so as to extend in the general direction of the portion 42M, as indicated at 41' (see Fig. 12). In this way the E plates are properly guided as they pass from the inclined portion 42M to the vertical portion 40A.

While not shown a brace is provided, extending between an upper part of the portion 42M downwardly to the machine frame or some part rigidly carried by the frame in order to provide support for the outer end of portion 42M.

*Ratchet plate and associated parts*

Located in a position intermediate the coil assembly station and the magazine is a ratchet plate which, as a whole, bears the number 70 (best shown in Figs. 6, 8 and 9). It comprises vertical side wall portions 71—71 cross-connected by a transverse wall portion 72. The vertical side wall portions 71—71 are provided with slots 73—73 which open through the top margins thereof. On the underside of the transverse wall portion 72 are two downwardly depending ribs 74 which are inclined upwardly and rearwardly as shown at 75 (see Fig. 6). Normally the lower front portion 76 rests on the surfaces 77 of the machine on which the E plates rest when in their intermediate position and along which they slide when being advanced toward assembly with the coil.

At the rear end of the ratchet plate are two downwardly extending projections 77, which also normally rest upon and are pressed against the surfaces on which the E plates are supported on their way to assembly position with the coil. The projections 77 terminate in a shoulder portion 78 which extends upwardly toward the plane of the adjacent portion of the inclined rib 74. The purpose of this shoulder will appear in connection with the explanation of the functioning of the ratchet plate.

For the purpose of pressing the ratchet plate downwardly there is provided at each side of the machine a lever 80 (best shown in Figs. 1 and 9) mounted on the frame part for swinging movement on the horizontal pivot 81. To the rear arm of lever 80 there is attached a spring 82, the upper end of which is attached to a fixed part of the machine at 83. Spring 82 is in tension and serves to urge the forward arm of lever 80 downwardly.

Extending crosswise of the ratchet plate 70 is a rod 84 having intermediate portions 85 of reduced diameter which are normally disposed in the slots 73 in the side walls 71 of the ratchet plate 70. The forward ends of levers 80 are notched to embrace reduced portions 86 of the cross rod 84, as is best shown in Figs. 1, 2 and 9.

From the foregoing it is obvious that downward movement of the front end portions of levers 80 through the medium of rod 84 functions to press the ratchet plate downwardly. However, the construction is such that the ratchet plate can rock with its front corner 76 as a pivot and can also rock with the rear portion 77 as a pivot. The purpose of such rocking action will be explained later. At the same time the construction is also such that if desired the ratchet plate can be quickly and easily removed to permit access to the E plates therebelow, in the event, because of some unusual condition, an E plate should become jammed in the machine. As is evident from the foregoing description, it is obvious that replacement of the parts to restore the operative condition can likewise be easily and quickly accomplished.

It is believed further structural features will best be understood in connection with an explanation of the manner in which the machine functions.

*Detailed explanation of machine operation*

Assume that there are two coils positioned in the coil-receiving stations of the cross-slide 42 and that the cross-slide has been shifted to the position shown in Figs. 2, 6 and 9. This places the left hand coil in position to receive E plates which are projected thereinto when the machine is in operation. When the left hand coil to be loaded first arrives at the loading position it will be understood it rests in its lowermost position i.e. at the level shown at the right hand station of Fig. 2 and after a sufficient number of E plates has been inserted to fill the space between the upper horizontal surface of angle member A and the surface A' of the coil as shown in Fig. 6, that the coil rises progressively higher as further E plates are assembled therewith.

Assume also that there are E plates in the magazine and that the toggle switch 100 (see Fig. 16) has been actuated to close the circuit and to energize the motor 37 through connections on the junction box J, it being understood the plug 101 has been inserted into a suitable electric outlet providing, say 100 v. current. The motor then operates continuously and drives the reduction gear 36 which, through the Scotch yoke arrangement (see Fig. 1) causes continuous reciprocation of the ejector feed-slide 34 and the parts carried thereby. The stroke of the ejector feed-slide is between the full line position shown in Fig. 6, which is the rearmost position and the position shown by dotted lines wherein the forward face 345F of lug 345 is in a plane coincident with the plane of the adjacent edges of the E plates assembled in the coil.

On the forward stroke of the ejector feed-slide 34 the shoulder portions 343' of lug 343 engage the rear edge of the lowermost E plate in the magazine and carry the plate forward to the intermediate position under the ratchet 70, as shown by full lines in Fig. 6. In the course of this movement the E plate, in passing from the magazine, is caused to assume a cambered shape, as shown in Fig. 15 in slightly exaggerated form for illustrative purposes. This results because the highest portions HP of the side ledges of lug 344 are in a plane slightly above the plane of the lower ends of the rails 416 under which the E plates must pass in moving from the magazine to the intermediate position. This cambering action assures that the rear edge of the E plate will be held in firm engagement with the shoulder portions 343' of the lug 343 so that positive forward feeding of the E plate is assured and possible "jamming" avoided.

It will be understood that the ratchet plate 70, because of the manner in which it is mounted, as before fully explained, rocks as necessary to permit the E plate to slide forwardly from the magazine position to the intermediate position.

Assume that at the time the ejector feed-slide makes a forward stroke there is located in the intermediate position an E plate which has been placed there on the previous forward stroke. That E plate will be advanced from the intermediate position into assembly position in the coil by engagement of the vertical portions 345F of lug 345. The forward movement of the E plate from the intermediate position to coil assembly position causes rocking movement of the ratchet plate by engagement of the E plate with the upward and rearwardly inclined surfaces 75 of the depending ribs 74.

Rearward movement of the E plate which is positioned under the ratchet plate 70 at the time the ejector feed-slide moves rearwardly is prevented by the front vertical portion 78 of the depending portions 77 of ratchet plate 70 (as best illustrated in Fig. 6).

The foregoing action continues until the requisite number of E plates has been inserted into the coil which is, at that time, in operative alignment with the path which the E plates follow as they are advanced, as before described.

As will be clear from Fig. 6, as the E plates are inserted under those previously assembled in the coil, the coil rises until at the proper time the upper side of the uppermost E plate contacts lever 45 swinging same on pivot 45P so that arm 45A moves downwardly permitting switch 43 to function to close the circuit to the solenoid 44 (as will be explained in detail later in connection with the electric circuit Fig. 16), thus swinging lever means 46 in a way shortly to be described and whereby the stack of E plates in the magazine is raised sufficiently to place the lowermost E plate of the stack above the horizontal plane in which the pick-off portion of lug 343 operates. Because of this action it is not necessary to stop the reciprocation of the ejector feed-slide whilst shifting the cross-slide 42 to permit removal of the loaded coil and the positioning of the unloaded coil in loading position.

It should be understood that the limit switch arrangement (switch 43, lever 45) is set to operate one lamination prior to the time the total desired number of laminations has been inserted into the coil. This operation will occur just as soon as the leading edge portions of the next to the last lamination to be assembled enter the coil and elevate the coil even before the E plate has been fully inserted. Hence, even though the solenoid 44 has been thus energized and the E plates in the magazine raised to prevent further advancement of E plates from the magazine, continued reciprocation of the ejector feed-slide will, on the next forward stroke advance that E plate which had been moved to the intermediate position by the previous forward stroke and insert it into the coil, thus completing the full complement of laminations. Since at this time the E plates in the magazine will have been raised above the path of the pick-off portions of the ejector feed-slide it is evident that further continued reciprocation of the ejector feed-slide will not forward E plates until the cross-slide has been shifted to place an empty coil in assembly position.

When the cross-slide 42 has been shifted to place the unloaded coil in loading position the circuit operation, as later explained, is such that the solenoid 44 is de-energized, thus causing lever 46 to return to the full line position shown in Fig. 6, thereby lowering the E plates in the magazine sufficiently again to place the lowermost one thereof in position to be removed from the magazine and the loading of the unloaded coil to take place, as before described.

The reason the lever 46 supports the E plate stack at an elevation above normal when the solenoid is energized and hence is in the position shown in dotted lines, is that lever 46 swings on the horizontal pivot 46H thus elevating the lower forward portion 46F to the position shown by the heavy dotted lines in Fig. 6. When lever 46, under the influence of spring 44S, returns to the full line position, the portion 46F then is lowered to the position shown by the light dotted lines in Fig. 6 wherein the upper face thereof is below the horizontal plane in which the pick-off lug portion of the ejector feed-slide operates.

It will be understood that while the empty or unloaded coil C2 (Fig. 18) is shown at the right of center that when coil C1 has been loaded and the cross-slide shifted to the left in order to place C1 in loading position and permit removal of the load coil the next empty coil will be placed in the pocket from which the coil C1 was removed. Hence the next shift of cross-slide will be from left to right.

*Operation of machine re electrical features*

The operation of the machine will now be summarized more particularly with respect to the electric circuit as illustrated in Fig. 16 of the drawings. As already stated, motor 37 continuously operates whenever the machine is in use and the actual feed of laminations is controlled by the selective actuation of solenoid 44. Switches are disposed, as already described, to control solenoid 44 and permit feeding of laminations only when a coil is in proper position in the cross-slide 42 and has not been filled with laminations. The power for the apparatus is provided from a conventional source of electricity through two-prong plug 101. It should be obvious that the machine may be permanently wired, if desired.

The upper conductor extending from plug 101 can be traced directly to toggle switch 100. The second conductor extending from plug 101 is permanently secured to the upper terminal of motor junction box J forming a part of motor 37. Extending from the upper motor terminal is a conductor which is, in turn, connected to a terminal LH on the transformer relay TR. The transformer relay is of a conventional kind having a primary winding P which is continuously energized from terminal LH and a second terminal LG connected through switch 100 to the line whenever the switch has been actuated to circuit closing position.

A secondary winding S magnetically coupled to winding P provides the magnetic flux for closing switch contacts SW1 and SW2 whenever a sufficiently small impedance is placed across the secondary terminals W and R. In the particular use herein described the secondary winding will, at all times, be either open or shorted through one or more switches.

Limit switch 43, which is a normally closed type switch held open by arm 45, is connected between terminals W and R to short the secondary winding and actuate the switches SW1 and SW2 whenever a completely assembled coil with laminations is present in the operating position of the apparatus. As already described when switch SW1 is closed, solenoid 44 is energized and the stack of laminations lifted to prevent feeding. Thus, when a coil is completely filled, the motor 37 will continue to run and the ejector feed-slide 34 to reciprocate, but the solenoid 44 will maintain the stack 41 above the ejector feed-slide.

When the cross-slide 42 is in one of its extreme positions the associated normally closed cross-slide switch CSR or CSL will, depending on the position of the cross-slide, be held open. However, when the operator shifts the cross-slide to the alternate position to place a new coil in position to be filled with laminations, both cross-slide switches CSR or CSL are momentarily closed. Thus, a circuit is completed including the secondary winding S, switches CSR and CSL and holding switch SW2.

Also, in parallel with cross-slide switches CSR and CSL is a normally closed switch CAM, opened momentarily once during each cycle by the Scotch yoke mechanism. In the particular embodiment shown, switch CAM is opened for a moment each time the ejector feed-slide 34 is at the fully extended position (shown in broken lines in Fig. 6). Thus although the filled coil C1 has been removed from the operative position, solenoid 44 remains energized through two holding circuits, one including holding switch SW2 and the cross-slide switches CSR and CSL, the second including switch SW2 and cycle switch CAM. Each cycle of the ejector feed-slide 34 momentarily opens switch CAM but during transition of the cross-slide switches CSR and CSL are closed in parallel with switch CAM and thus the latter is not effective. When the transition of the cross-slide has been completed the appropriate switch, either CSR or CSL, is opened and thus during the subsequent cycle of the ejector feed-slide 34, switch CAM will be opened and the holding circuit completely broken. At that time the secondary winding S is deenergized, opening holding switch SW2 and solenoid switch SW1 initiating feeding of laminations into the newly positioned coil. Upon filling a subsequent coil with laminations, limit switch 43 is permitted to close and the solenoid 44 is again energized, repeating the sequence of operations described above.

From the foregoing description it will be seen that in order to reestablish the E plate feeding action after a coil has been completely loaded with laminations it is necessary that at least one of the normally closed switches CSR or CSL be held open, that the normally closed limit switch 43 be held open by the lever 45, which obtains except when a fully loaded coil remains in position under the overlying portion of lever 45 and that the normally closed switch CAM shall have been momentarily opened. By momentarily opening switch CAM when the ejector feed-slide 34 is at an extreme forward end of its stroke there is no danger of the lugs on the feed slide interfering with the downward movement of the E plates in the magazine as is necessary to proper machine operation. However, switch CAM can be momentarily opened at other stages of the cycle except that as a practical matter it is best not to cause the momentary opening precisely when the cross-slide is at the extreme rear position since there would then be danger of the ejector feed-slide starting forward before the stack of E plates in the magazine could actually be raised out of the way.

*Description of miscellaneous other features*

There are several detail features embodied in the machine illustrated in the drawings, the functioning of which has not been heretofore explained and which can conveniently be covered under this general heading.

Referring particularly to Figs. 6, 9, 17, 18, 19 and 20, it will be seen that the cross-slide 42, at each coil holding station or recess is provided with an angle plate member A having a flat vertical portion 42V and a horizontally disposed portion 42H. The flat vertical portion is positioned in a recess 42R in the cross-slide and is secured in place by means of a suitable fastener 42F. The angle plate A comprises an inclined surface portion 42B (where the vertical and horizontal portions merge) so that when the front edge portion of the center leg of the E plate engages the same it will act as a cam surface to guide that portion of the E plate upwardly into a plane slightly higher than the plane in which the E plate moves as it is advanced to assembly position in the coil from the intermediate position.

The same function is served with respect to the side legs of the E plate by the inclined cam surfaces 42C on the cross-slide, a pair thereof being located on opposite sides of the center of each coil holding recess, as is perhaps best shown in Fig. 17.

Thus, one function of the angle plate A is to cam the center leg of the E plate into a plane coincident with that of the upper face bar portion of the cross-slide on which the side legs of the E plate rest when they have been assembled with the coil.

It should be understood that sometimes the build-up of the coil to be supplied with E plates is such that the "windows" in the E plate i.e. the spaces between the center leg and the side legs are wider than the build-up of the coil. However, the central opening in the coil is always the same dimension as that of the center leg of the E plate which is to be assembled with the coil. For this reason the horizontal portion 42H of the plate A serves properly to center the coil relative to the E plate to be inserted therein. For this purpose the horizontal portion is forwardly restricted as at 42RS (see Fig. 17) which permits easy entrance into the coil opening. The rear portion AR is substantially equal in width to that of the opening in the coil and therefore serves to center the coil and E plates for proper assembly.

It should be stated that the thickness of the angle plate A, as shown in the drawings, is greater than obtains in practice but is so shown for illustrative purposes. That is to say, the actual thickness of the angle plate A preferably is even less than that of an E plate. It will be understood the reason for making the angle plate A of relatively thin stock is that when the coil has received its full complement of E plates the horizontal portion of the angle plate will be disposed between the central leg of the lowermost E plate and the adjacent wall of the coil structure. However, such disposition is readily accommodated and yet permits ready removal of the loaded coil because the conventional coil comprises a paper tube on which the wire is wound. The paper tube is of sufficient thickness that slight compressibility is possible. The paper tube is illustrated at T in Figs. 2 and 4.

Another function of the angle plate A is to prevent the advancing edge portions of the central leg of the E plate from gouging the paper tube T of the coil.

As is perhaps best shown in Figs. 2 and 6, the head portion 51 of the bracket 52 extends slightly above the plane of the lowermost E plates in the coil, thus acting as a positive stop to limit movement of the lowermost E plates in that direction.

For the purpose of automatically locating the coil holding stations of cross-slide 42 in E plate assembly position as it is manually shifted from side to side, there is provided a ball 100C which is urged in the direction of the frame of the machine by spring 101C. The machine frame is provided with two recesses 102 and 103 spaced upon opposite sides of the longitudinal center vertical plane of the machine. When the cross-slide 42 has been shifted to the right, as shown in Figs. 2 and 9 ball 100C enters recess 103, thus locating the left hand coil station in position for the coil to receive the E plates and when the cross-slide has been shifted to the left ball 100C enters recess 102 and locates the other coil station in position for the coil position therein to receive the E plates.

The disclosed practical embodiment of the invention functions at high speed to assemble E plates in a coil with very little trouble due to jamming. In the event, because of some vary abnormal condition, a "jam" should occur the machine is so constructed that the necessary parts can be quickly and easily removed, the "jam" corrected and the removed parts quickly and easily replaced.

Plates for assembly with coils are sometimes termed core plates and in certain of the claims have been so termed.

I claim:

1. A machine for automatically assembling core plates in an open-ended coil comprising in combination means for holding a vertical stack of core plates, means for supporting an open-ended coil at an assembly station spaced from said means for holding a vertical stack of core plates, cyclically movable means for removing core plates from the bottom of the stack and advancing them into assembly relation with a coil at said assembly station, said cyclically movable means including pick-off structure for abutting an edge of at least the bottom core plate of the stack and moving said core plate in the direction of the assembly station, means for constantly imparting cyclical motion to said movable means, means for causing relative vertical separation between the pick-off structure of the movable means and the lowermost core plate of the stack whereby the pick-off structure is rendered inoperative to engage and remove core plates from the stack, and means automatically operable when a predetermined number of core plates has been assembled with the coil for actuating the means for causing said vertical separation between the pick-off structure and the lowermost core plate of the stack, thereby interrupting removal of the core plates from the stack whilst said cyclically movable means continues to operate.

2. The combination set forth in claim 1 in which the means for causing relative vertical separation between the pick-off structure and the lowermost core plate of the stack comprises structure for raising at least the bottom part of the stack of core plates.

3. The combination set forth in claim 2 in which the structure for raising at least the bottom part of the stack of core plates comprises a solenoid actuated lever which is actuated when the solenoid is energized.

4. A machine for automatically assembling core plates in an open-ended coil comprising in combination means for holding a vertical stack of core plates, means for supporting an open-ended coil at an assembly station spaced from said means for holding a vertical stack of core plates, cyclically movable means for removing core plates from the bottom of the stack and advancing them into assembly relation with the coil, said cyclically movable means including pick-off structure for abutting an edge of at least the bottom core plate of the stack and moving said core plate in the direction of the assembly station, means for constantly imparting cyclical motion to said movable means, means for causing relative vertical separation between the pick-off structure of the movable means and the lowermost core plate of the stack whereby the pick-off structure is rendered inoperative to engage and remove core plates from the stack, means automatically operable when a predetermined number of core plates has been assembled with the coil for actuating the means for causing said vertical separation between the pick-off structure and the lowermost core plate of the stack, thereby interrupting removal of the core plates from the stack whilst said cyclically movable means continues to operate, and means for restoring the initial vertical operating relationship between the pick-off structure and the lowermost core plate of the stack upon the removal of the filled coil from the assembly station and the placement of an empty coil at the assembly station, thereby reestablishing the action of the pickoff structure in abutting the edge of at least the bottom core plate of the stack and moving the same in the direction of the assembly station.

5. The combination set forth in claim 4 in which the means for restoring the initial vertical operating relationship between the pick-off structure and the lowermost core plate of the stack includes means controlling the timing, whereby the pick-off means is in a preselected position relative to the assembly station when the initial operating relationship is restored.

6. A machine for automatically assembling core plates in an open-ended coil comprising in combination means for holding a vertical stack of core plates, shiftable means for supporting a plurality of open-ended coils, one thereof at an assembly station spaced from said means for holding a vertical stack of core plates and the other offset from the assembly station position, cyclically movable means for removing core plates from the bottom of the stack and advancing them into assembly relation with the coil, said cyclically movable means including pick-off structure for abutting an edge of at least the bottom core plate of the stack and moving said core plate in the direction of the assembly station, means for constantly imparting cyclical motion to said movable means, means for causing relative vertical separation between the pick-off structure of the movable means and the lowermost core plate of the stack whereby the pick-off structure is rendered inoperative to engage and remove core plates from the stack, means automatically operable when a predetermined number of core plates has been assembled with the coil for actuating the means for causing said vertical separation between the pick-off means and the lowermost core plate of the stack, thereby interrupting removal of the core plates from the stack whilst cyclically movable means continues to operate, and means for restoring the initial vertical operating relationship between the pick-off structure and the lowermost core plate of the stack automatically operable upon the shiftable means being shifted to move the empty coil to assembly station position from its offset position with relation thereto.

7. The combination set forth in claim 1 in which the core plate pick-off structure advances the removed core plate to a position intermediate the stack of core plates and the assembly station and other structure of the cyclically movable means moves the plate from said intermediate position to assembly station position with the coil, and in which the means for causing relative vertical separation of the pickoff structure and the lowermost core plate of the stack comprises means formed and arranged to operate when the number of core plates assembled in the coil is less than the full complement desired by that number of core plates disposed intermediate the stack of core plates and the assembly station.

8. A machine for automatically assembling core plates in an open-ended coil comprising in combination means for holding a stack of core plates, shiftable means for supporting a plurality of open-ended coils, one thereof at an assembly station spaced from the means for holding the stack of core plates and at least one other offset from the assembly station, cyclically movable means for removing core plates from the bottom of the stack and advancing them into assembly relation with the coil at said assembly station, said cyclically movable means including pick-off structure for abutting an edge of at least the bottom core plate of the stack of core plates and moving the core plate in the direction of the assembly station, means for constantly imparting cyclical motion to said cyclically movable means, electrically actuatable means for causing relative vertical separation between the bottom of the stack of core plates and said pick-off means, means automatically operable to energize the electrically actuatable means when a predetermined number of core plates has been assembled in the coil at the assembly station whereby said pick-off structure is rendered inoperative to engage and remove core plates from the stack, means for maintaining the energization of said electrically actuatable means while the shiftable means is being shifted to position an empty coil at the assembly station and additional means for maintaining the energization of the electrically actuatable means until such time as the said pick-off structure is in a predetermined position relative to the stack of core plates, thereupon causing deenergization of the electrically actuatable means and restoring the pickoff structure to core plate advancing position relative to the stack of core plates.

9. The combination set forth in claim 8 which includes electrical circuitry formed and connected to maintain electrical energization of the electrically actuatable means for causing relative vertical separation between the bottom of the stack of core members and the pick-off means at such times as the said shiftable means is so positioned that neither coil is located at the assembly position.

10. A machine for automatically assembling core plates in an open ended coil comprising in combination means for holding a stack of core plates, means for supporting an open-ended coil at an assembly station spaced from the means for holding the stack of core plates, cyclically movable means engaging and removing core plates from the bottom of the stack and advancing them into assembly relation with the coil, means for constantly imparting cyclical motion to said cyclically movable means, means for bowing the core plate as it passes from the stack of core plates so that the central portion of the core plate is at a higher elevation than the opposite side marginal portions to assure that the cyclically movable means will remove the core plate from the stack of core plates, and means automatically causing relative vertical separating movement between the bottom of the stack of core plates and a portion of said cyclically moving means when a predetermined number of cores plates has been assembled in the coil whereby removal of core plates from the stack is interrupted while said cyclically movable means continues to operate.

11. A machine for automatically assembling E plates in an open-ended coil comprising in combination means for holding a stack of E plates, means for supporting an open-ended coil at an assembly station spaced from the means for holding the stack of E plates, constantly actuated cyclically movable means for removing E plates from the bottom of the stack and advancing them into assembly relation with the coil, means automatically causing relative vertical separating movement between the bottom of the stack of E plates and at least portions of said constantly actuated cyclically movable means when a predetermined number of E plates has been assembled in the coil whereby removal of E plates from the stack is interrupted without interrupting the constantly actuated cyclically movable means, and guide plate means carried by the coil supporting means formed and positioned to extend into the opening of a coil carried by the coil supporting means at the assembly station and serving to guide the central leg of the E plate into the opening in the coil so positioned.

12. The combination set forth in claim 11 in which the guide plate means at the assembly station is positioned in a plane above the plane of the advancing E plate, said guide plate means serving to cam the central leg of the E plate into the coil opening and to form a support for E plates during assembly with the coil.

13. The combination set forth in claim 12 in which the said guide plate means is located in the empty coil in a plane intermediate those portions of the coil defining the top and bottom of the coil opening.

14. A machine for automatically assembling core plates in an open-ended coil comprising in combination means for holding a vertical stack of core plates, means for supporting two open-ended coils, said last mentioned means being shiftable between two extreme positions wherein, when in either extreme position, one coil is located at an assembly station spaced from the means for holding the stack of core plates, constantly reciprocating means for removing core plates from the bottom of the stack of core plates and advancing them into assembly relation with that coil positioned at the assembly station, electrically actuatable means for raising at least the bottom portion of the stack of core plates above that portion of the reciprocating means which is operative to engage and remove core plates from said stack, means for energizing said last mentioned means when a predetermined number of core plates has been assembled in the coil at the assembly station whereby removal of core plates from the stack is interrupted without interrupting the actuation of said reciprocating means, two normally closed-type electric switches electrically connected to cause energization of said electrically actuatable means when both said switches are closed, one of said switches being positioned to be opened by said coil holding means when it is in one of its extreme positions and the other when the coil holding means is in the other extreme position, and both said switches being closed when said coil holding means is so positioned that neither coil is located at the assembly position.

15. A machine for automatically assembling core plates in an open-ended coil comprising in combination means for holding a vertical stack of core plates, means for supporting two open-ended coils, said last mentioned means being shiftable between two extreme positions wherein, when in either extreme position, one coil is located at an assembly station spaced from the means for holding the stack of core plates, constantly reciprocating means for removing core plates from the bottom of the stack of core plates and advancing them into assembly relation with that coil positioned at the assembly station, electrically actuatable means for raising at least the bottom portion of the stack of core plates above that portion of the reciprocating means which is operative to engage and remove core plates from said stack, means for energizing said last mentioned means when a predetermined number of core plates has been assembled in the coil at the assembly station whereby removal of core plates from the stack is interrupted without interrupting the actuation of said reciprocating means, two normally closed-type electric switches electrically connected to cause energization of said electrically actuatable means when both said switches are closed, one of said switches being positioned to be opened by said coil holding means when it is in one of its extreme positions and the other when the coil holding means is in the other extreme position, both said switches being closed when said coil holding means is so positioned that neither coil is located at the assembly position and another normally closed-type holding switch electrically connected to maintain energization of said electrically actuatable means until one of said switches has been opened by the shifting of said shiftable coil holding means and means for opening said closed-type holding switch when said constantly reciprocating means is in a predetermined part of its cycle.

References Cited in the file of this patent

UNITED STATES PATENTS

| 1,966,878 | Bluzat | July 17, 1934 |
| 2,494,349 | Mittermaier | Jan. 10, 1950 |
| 2,835,026 | Saari | May 20, 1958 |